(12) United States Patent
Veillette

(10) Patent No.: US 7,139,532 B2
(45) Date of Patent: Nov. 21, 2006

(54) COMBINED T/R SWITCH WITH LNA AND A METHOD OF IMPROVING THE PERFORMANCE OF A RECEIVER

(75) Inventor: Benoit R. Veillette, Shrub Oak, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 831 days.

(21) Appl. No.: 10/014,227

(22) Filed: Dec. 11, 2001

(65) Prior Publication Data
US 2003/0109235 A1   Jun. 12, 2003

(51) Int. Cl.
*H04B 1/44* (2006.01)
*H04B 1/40* (2006.01)

(52) U.S. Cl. .......................................... 455/78; 455/87
(58) Field of Classification Search .................. 455/78, 455/87
See application file for complete search history.

(56) References Cited

U.S. PATENT DOCUMENTS

| | | | |
|---|---|---|---|
| 4,637,073 A * | 1/1987 | Selin et al. .................... | 455/78 |
| 5,270,667 A | 12/1993 | Upton | |
| 5,289,142 A | 2/1994 | Upton | |
| 5,345,591 A | 9/1994 | Tsurumaki et al. | |
| 5,554,865 A | 9/1996 | Larson | |
| 5,964,708 A | 10/1999 | Freeman et al. | |
| 2003/0048698 A1 * | 3/2003 | Barnes et al. ................ | 367/181 |

FOREIGN PATENT DOCUMENTS

EP    0391326    10/1990

* cited by examiner

*Primary Examiner*—Barry Taylor

(57) ABSTRACT

In accordance with the present invention, a receiver circuit and a method of controlling voltage pulses, thereby improving the performance of the receiver are provided. The receiver circuit includes a switch for blocking high voltages and for converting voltage signals to current signals. The switch includes first and second signal terminals and a control terminal. The switch exhibits an ON resistance when closed, wherein the ON resistance is controlled by an electric value at the control terminal. The receiver circuit also includes a control circuit coupled to the switch for controlling the ON resistance of the switch in closed mode. The first switch signal terminal is coupled to an output of a transducer and the second switch signal terminal is coupled to an input of a low-noise amplifier circuit. The switch is a transmit/receive switch which is open during a transmission time interval and closed during a reception time interval. The switch passes only low-voltage pulses to the low-noise amplifier circuit which requires an input resistance and a feedback resistance. The ON resistance of the switch is the input resistance of the low-noise amplifier circuit. The control circuit is a servo-loop circuit for generating an electric value at the control terminal of the switch when closed.

13 Claims, 3 Drawing Sheets

COMBINED T/R SWITCH WITH LNA AND A METHOD OF IMPROVING THE PERFORMANCE OF A RECEIVER

BACKGROUND OF THE INVENTION

1. Field of the Invention

The present invention relates to receiver circuits. Particularly, the present invention is directed to improving the performance of a receiver through a combination of a transmit/receive (T/R) switch protecting the receiver electronics with a Low-Noise Amplifier (LNA).

2. Description of Related Art

Generally, communications systems transfer information from a source to a destination using a combination of a transmitter and a receiver. Typically, the transmitter includes a transducer and a transmission element which together convert an electrical signal into an electromagnetic signal. The electromagnetic signal then propagates through a transmission medium to the receiver, which converts the signal with the help of another transducer into a desired form for a use by an end user. The transmission medium may be any of a variety of suitable devices, including copper cable, optical fiber or even air.

The present invention relates particularly to receivers for duplexed transducers, such as those typically present in ultrasound systems. In an ultrasound system, for example, a piezo-electric transducer converts an electronic signal to a sound wave. The same piezo-electric transducer may also perform the converse transformation such that a received sound wave is converted into an electrical signal. The present invention relates to systems where transducers are used for both the generation and the detection of ultrasound waves. Scanning along a line radiating from a transducer, as shown in FIG. 1, is performed as follows.

First a transmitter, in the ultrasound system creates a high-voltage pulse. The high-voltage pulse is applied to the transducer during a short transmission time interval to create an ultrasound wave. The ultrasound wave is reflected by an interface between regions of different acoustic impedance. For example, in medical imaging, the interface between the liver and surrounding tissues would reflect the ultrasound pulse. The reflected ultrasound pulse is absorbed during a reception time interval by the transducer, which creates a low-voltage pulse as a result. A receiver in the ultrasound system amplifies and processes the received low-voltage pulse.

A low-noise amplifier (LNA) is an electronic circuit of the receiver that amplifies the low-voltage pulse while minimizing the amount of electronic noise added to the low-voltage pulse. An important characteristic of this LNA is its input impedance. The input impedance of the LNA will present a load to the transducer. A very crude model of the transducer is a transformer operating between different domains as illustrated in FIG. 2. For ultrasound imaging system, for example, the two domains are electric and acoustic. In receiving mode, the acoustic signal stimulating the transducer can be modeled in the electrical domain as a voltage source. To maximize power conversion between domains by the transducer, it is necessary to load the transducer with an impedance equal to the impedance associated with the voltage source on the acoustic side of the transformer, as seen from the electric side. The LNA should therefore ideally present an input impedance equal to this value. Because the real part of the transducer impedance is small, ranging from 40 ohms to 400 ohms, the LNA should typically have a small input impedance.

An example of a circuit implementation of an LNA is illustrated in FIG. 3. LNA may be composed of an operational amplifier (op-amp) and two resistors. The purpose of the op-amp is to establish a virtual ground at the common terminal of the two resistors. The first resistor, $R_i$, converts an input voltage to a current and the second resistor, $R_f$, converts this current back to a voltage. The input impedance of the LNA circuit illustrated in FIG. 3 therefore is equal to $R_i$ while the voltage gain is established by the ratio of $R_f$ over $R_i$. The present invention relates to this type of LNA where the input voltage is first converted to a current.

Such a LNA typically is used only with low-voltage signals and is generally implemented in a silicon integrated circuit (IC) process that can not tolerate high-voltages. Therefore, it is necessary to position a transmit/receive (T/R) switch between the transducer and the LNA to prevent high-voltage pulses applied to the transducer, such as during the transmission time interval of an ultrasound system, from damaging the LNA. The T/R switch is open during the transmission time interval and closed during the reception time interval, thus passing only the low-voltage pulses to the LNA. An exemplary T/R switch is shown in FIG. 4A. This exemplary switch includes two Metal-Oxide-Silicon (MOS) devices. The gate-to-source voltage, defined as the potential difference between $V_G$ and $V_S$, controls the resistance of the switch. The switch may thus be represented as a variable resistance as depicted in FIG. 4B. For a gate-to-source voltage below the threshold voltage of the MOS devices, the T/R switch presents a very high impedance and is therefore essentially open. The present invention disclosed herein, however, is not limited to the type of T/R switch.

Because the T/R switch is not ideal, i.e. demonstrating no resistance, it will exhibit a small resistance when closed. This resistance can be labeled ON resistance and denoted $R_{on}$. For purposes of illustration, the circuit in FIG. 5 shows a circuit comprising a T/R switch which is represented as an ideal switch in series with the ON resistance, and an op-amp-based LNA. The ON resistance of the T/R switch may be detrimental for at least two reasons. First, the ON resistance reduces the signal amplitude appearing at the input of the LNA because of a voltage divider effect. In particular, the signal amplitude at the input of the LNA will be the amplitude of the signal at the input terminal of the T/R switch scaled by the ratio of the input impedance of the LNA over the sum of the input impedance of the LNA and the ON resistance of the T/R switch. Second, the ON resistance generates electronic noise, which can reduce signal quality. The magnitudes of the adverse effects are proportional to the ON resistance.

Therefore, the ON resistance of a T/R switch must be reduced. In practice, the ON resistance preferably would be made much smaller than the LNA input impedance. Reducing the ON resistance of the T/R switch, however, would require increasing the size of the T/R switch circuit. Because larger circuits are more expensive to fabricate and also exhibit larger unwanted capacitances that limit high-frequency operation, an alternative approach is required.

There is thus a need for a circuit where the ON resistance of the T/R switch may be made larger, thus reducing fabrication costs and unwanted capacitances.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and broadly described, the invention includes a receiver circuit, including a switch for blocking high voltages and for converting voltage signals to current signals. The switch includes first and second signal terminals and a control terminal. The switch exhibits an ON resistance when closed, wherein the ON resistance is controlled by an electric value at the control terminal. The receiver circuit also includes a control circuit coupled to the switch for controlling the ON resistance of the switch in closed mode. The first switch signal terminal is coupled to an output of a transducer and the second switch signal terminal is coupled to an input of a low-noise amplifier circuit. The switch is a transmit/receive switch which is open during a transmission time interval and closed during a reception time interval. The switch passes only low-voltage pulses to the low-noise amplifier circuit which requires an input resistance and a feedback resistance. The ON resistance of the switch is the input resistance of the low-noise amplifier circuit. The control circuit is a servo-loop circuit for generating an electric value at the control terminal of the switch when closed.

The servo-loop circuit includes a current source having an input terminal and an output terminal. The servo-loop circuit further includes a master switch having an ON resistance and a control terminal responsive to an electrical value. The master switch is coupled to the output of the current source, whereby a current $I_{REF}$ is passed through the master switch and the electrical value at the control terminal of the master switch is capable of adjusting the voltage across the switch when closed to match a reference voltage $V_{REF}$. The switch utilizes the electrical value at the control terminal of the master switch. The servo-loop circuit comprises a single switch with the electrical value at the controlling terminal adjustable during system idle time.

The invention also includes a method of controlling voltage pulses, thereby improving the performance of the receiver circuit. The method includes the step of providing a receiver circuit having a T/R switch and a control circuit. The switch includes first and second signal terminals and a control terminal. The switch exhibits an ON resistance when closed. The ON resistance is controlled by an electric value at the control terminal. The method further includes the steps of receiving voltage pulses at the first signal terminal, blocking high voltages applied to a transducer and passing only low-voltage pulses through the switch. Moreover, the method includes the steps of converting the low-voltage signals to current signals using the switch and controlling the ON resistance of the switch when closed using the control circuit.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Reference will now be made in detail to the present preferred embodiments of the invention, an example of which is illustrated in the accompanying drawings. The method and corresponding steps of the invention will be described in conjunction with the detailed description of the system.

In accordance with the present invention a receiver circuit is provided, the circuit comprising a switch for blocking high voltages when open and for converting voltage signals to current signals when closed. A typical switch used in accordance with the present invention is illustrated in FIG. 4B. The switch comprises first 405 and second 410 signal terminals and a control terminal 400. Depending on the type of switch used, the switch exhibits an ON resistance, preferably controlled by an electric value at the control terminal, when closed. The electric value could be a voltage, current or a charge.

Figure 6:
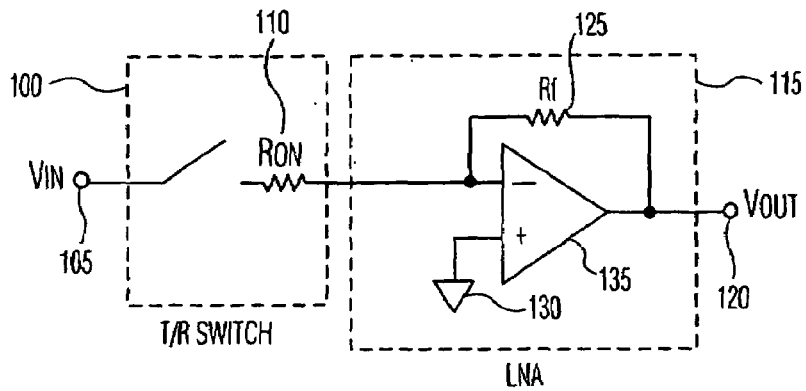
FIG. 6 is a schematic diagram of an embodiment for a combination of a T/R switch with a LNA in accordance with the present invention.

According to the preferred embodiment of the present invention, the receiver circuit further includes an LNA for amplifying a low-voltage pulse received from the second signal terminal 410 while minimizing the amount of electronic noise added to the low-voltage pulse. For example, and not by limitation, when the receiver circuit includes an LNA which conventionally would require an op-amp with an input resistance and a feedback resistance, the input resistance of the LNA is replaced by the internal ON resistance of the T/R switch 100 to realize the voltage-to-current conversion, with the help of the op-amp virtual ground. This arrangement, as embodied herein, is depicted in FIG. 6. The T/R switch 100 is coupled to input voltage $V_{in}$ 105 from a transducer. The T/R switch is typically located between the transducer and the LNA (depicted as component 115). Therefore, the input voltage 105 can be an output of a transducer. The T/R switch 100 presents an internal resistance, represented schematically as resistor $R_{on}$ 110, which converts voltage to current. The output of the T/R switch 100 is coupled to the negative input terminal of the op-amp 135 included in the LNA 115. The positive terminal of the op-amp 135 is connected to a power supply terminal 130 which is coupled to a source of operating potential such as, for example, ground. The LNA further includes a feedback resistor $R_f$ 125 which converts the current created by the resistor $R_{on}$ back to a voltage. The output of the LNA 115 is $V_{out}$ 120. The input impedance of the receiver as seen by the transducer is equal to $R_{on}$ while the voltage gain is set by the ratio of $R_f$ over $R_{on}$.

In accordance with the invention, as shown in FIG. 6, the ON resistance of the T/R switch can be much larger than otherwise permitted in a conventional prior art system. Consequently, the silicon area occupied by the T/R switch circuit can be smaller, thereby resulting in smaller fabrication costs. Furthermore, smaller circuits present less unwanted capacitance. Reducing the unwanted capacitance enables higher frequency operation.

Figure 1:
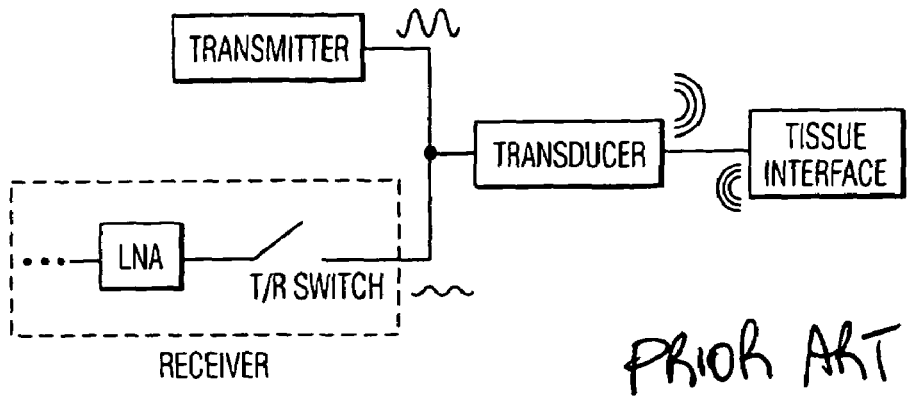
FIG. 1 is a schematic diagram of a typical application of a transducer in an ultra-sound system.
Figure 2:
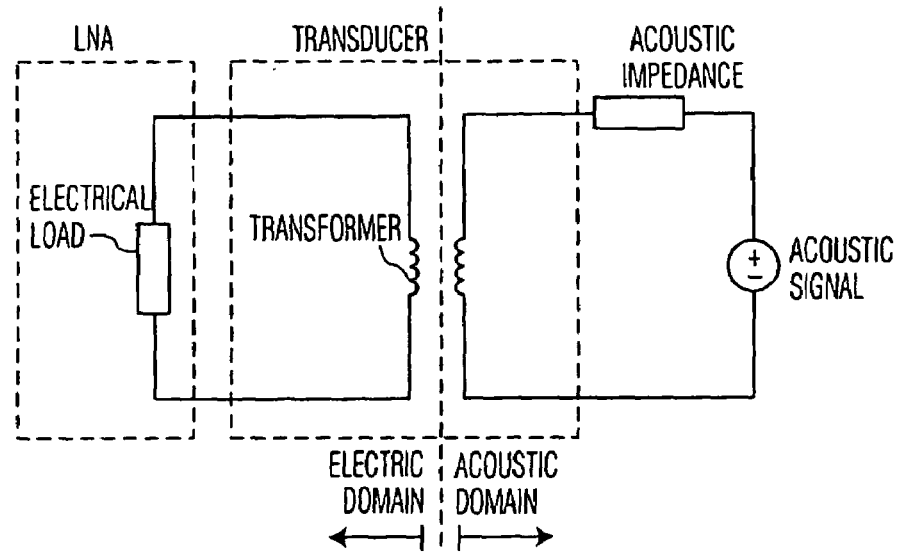
FIG. 2 is a schematic diagram of a typical transducer.
Figure 3:
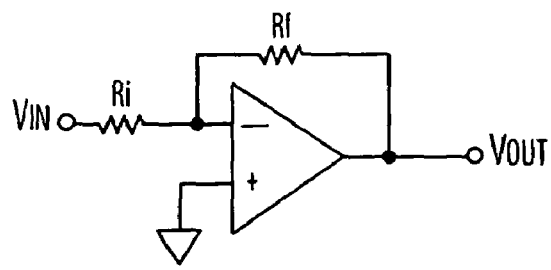
FIG. 3 is a schematic diagram of a prior art Low-Noise Amplifier (LNA)
Figure 4A:
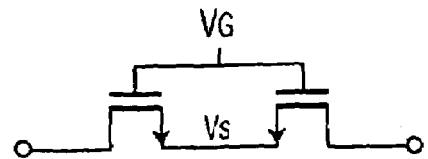
FIGS. 4A–4B are schematic diagrams of a prior art transmit/receive (T/R) switch.
Figure 4B:
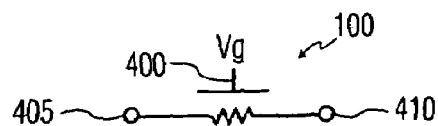
Figure 5:
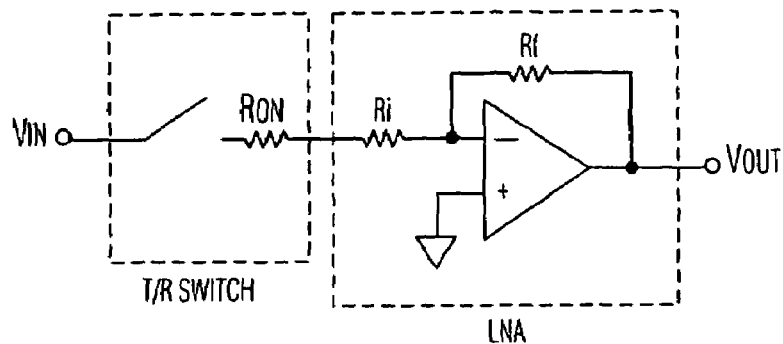
FIG. 5 is a schematic diagram of a prior art combination of a T/R switch with a LNA.

In accordance with a preferred embodiment of the present invention, the T/R switch 100 comprises MOS devices similar to that of FIG. 4A. However, for correct operation, the ON resistance of the switch needs to be predictable. All integrated circuit manufacturing processes are limited by variations to their parameters. In fact, process variations may affect the resistance of a MOS device by as much as 50%. Therefore, the ON resistance of the T/R switch needs to be accurately controlled after manufacturing to obtain a predictable input impedance and gain. Most circuits realizing a T/R switch have some electronic means of tuning the ON resistance. In a MOS based T/R switch, in accordance with an additional aspect of the present invention, the gate-to-source voltage may serve this purpose. Increasing the gate-to-source voltage will lower the ON resistance of the T/R switch.

Figure 7:
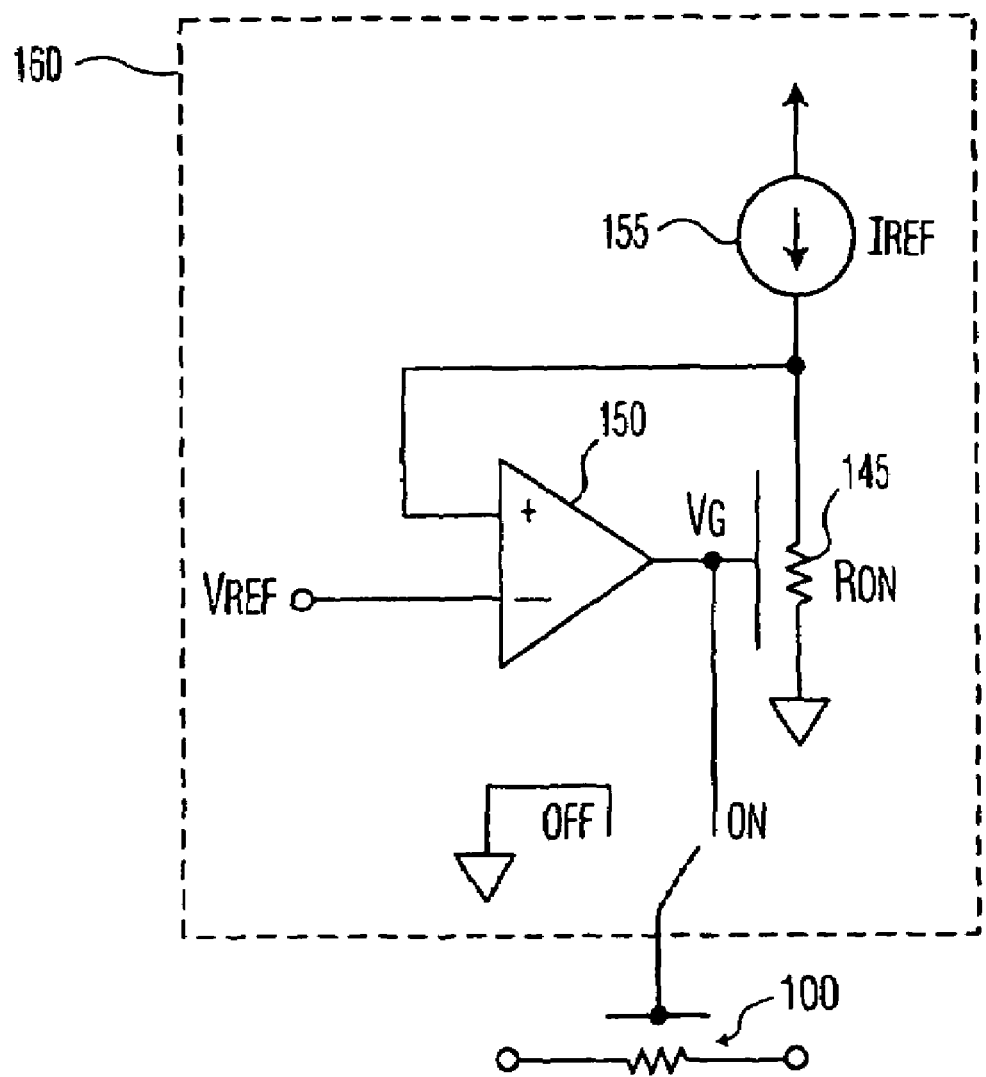
FIG. 7 is a schematic diagram of an embodiment for a servo-loop circuit in accordance with the present invention.

In accordance with another the invention, the receiver circuit further includes a control circuit 160 coupled to the switch for controlling the ON resistance of the switch in closed mode. According to the preferred embodiment of the present invention, the control circuit is a servo loop, as illustrated in FIG. 7, which is built to generate the controlling voltage of the T/R switch 100. The servo loop circuit 160 includes an op-amp 150 coupled to a current source 155. The current source 155 is coupled to a master T/R switch 145. The purpose of the servo loop circuit is to calibrate the ON resistance of the master T/R switch 145. The gate voltage that achieves calibrated ON resistance is then distributed to a slave T/R switch 100 used in the receiver circuit. The dimensions of the master T/R switch 145 and slave T/R switch 100 are chosen to be equal if they share the same voltage, so that their ON resistance will be equal as well.

The circuit illustrated in FIG. 7 operates as follows. A constant current $I_{REF}$ is passed through a replica of the T/R switch 100 having an ON resistance labeled $R_{on}$. This replica T/R switch 145 is designated as master. The gate voltage $V_G$ is adjusted so that the voltage across the master T/R switch 145 matches a reference voltage $V_{REF}$. The resistance $R_{on}$ of the master T/R switch 145 is then guaranteed to be the ratio of $V_{REF}$ and $I_{REF}$. The same gate voltage $V_G$ is then employed for the T/R switch 100 located in the signal path when in the on state. This T/R switch 100 is given the label "slave".

The output of the slave T/R switch 100 is coupled to an input of a component 115, which for purposes of example is depicted as the LNA in FIG. 6. However, various alternative circuits can benefit from the advantages of the present invention. For example, another circuit capable of realizing the T/R switch function may be a diode bridge. In such a case, the ON resistance is controlled by the current biasing the diodes. Increasing the bias current will reduce the ON resistance.

The method and system of the present invention, as described above and shown in the drawings, provide for a more efficient and cost effective way to improve the performance of a receiver through the resolution of the shortcomings of the ON resistance of the T/R switch.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

For example, several variations are possible on the scheme illustrated in FIG. 7. The servo loop illustrated in FIG. 7 can accommodate a current-controlled T/R switch. The servo loop is essentially the same except that the variable voltage source is replaced by a variable current source. Copies of the current flowing in the master T/R switch are distributed to the slave T/R switches.

In addition, the servo loop may be operated only for a short time period at the beginning of the reception time interval. The electrical value at the controlling terminal is then stored by the slave T/R switches for the duration of the reception time interval. For example, the gate voltage of a MOS slave T/R switch can be stored using the gate capacitance of the MOS transistors. When the electrical value at the controlling terminal is not being updated, the servo loop would be turned off to conserve power. This is the system idle time.

In addition, a master T/R switch that is smaller than the slave may be employed to reduce silicon area and power for the servo loop. The master T/R switch then needs to be tuned for a larger ON resistance than the desired slave T/R switch ON resistance. For example, if the size of the master T/R switch is a quarter of the size of the slave T/R switch and the relationship between the size and the ON resistance is inversely linear (which is typically a valid assumption for MOS T/R switches), then the master T/R switch needs to be tuned to four times the desired slave T/R switch ON resistance.

Finally, as an alternative to a master/slave control, a single switch can be used and the controlling voltage can be adjusted during system dead time. For example, in ultrasound imaging systems, there are times when the transducers are neither transmitting nor receiving. At these times, the T/R switch is inserted in the servo loop and the electric value at the controlling terminal achieving the desired ON resistance is determined. In normal operation, the T/R switch is returned to the circuit and the electric value at the controlling terminal is kept constant.

What is claimed is:

1. A receiver circuit, comprising:
   a transmit/receive (T/R) switch for blocking high voltages and for converting voltage signals to current signals, said switch comprising first and second signal terminals and a control terminal, wherein said switch is connected at the second terminal to a low-noise amplifier and exhibits an ON resistance when closed, and wherein said ON resistance controlled by an electric value at said control terminal; and
   a control circuit coupled to said switch at said control terminal for controlling said electric value and said ON resistance of said switch in closed mode in order that only low-voltage pulses are passed to the low-noise amplifier circuit, wherein said control circuit is a servo-loop circuit for generating an electric value at said control terminal of said switch when closed.

2. The receiver circuit of claim 1, wherein the low-noise amplifier circuit requires an input resistance and a feedback resistance, and further wherein said ON resistance of said switch is the input resistance of said low-noise amplifier circuit.

3. The receiver circuit of claim 1, wherein said servo-loop circuit comprises:
   a current source having an input terminal and an output terminal;

a master switch, said master switch having an ON resistance and a control terminal responsive to an electrical value, said master switch is coupled to said output terminal of the current source, whereby a current $I_{REF}$ is passed through said master switch and said electrical value at the control terminal of the master switch is capable of adjusting the voltage across said switch when closed to match a reference voltage $V_{REF}$;

said switch utilizing said electrical value at said control terminal of said master switch.

4. The receiver circuit of claim 1, wherein said servo-loop circuit comprises a single switch with the electrical value at the controlling terminal adjustable during system idle time.

5. A receiver circuit, comprising:
a T/R switch for blocking high voltages and for converting voltage signals to current signals, said T/R switch comprising first and second signal terminals, and a control terminal, said switch exhibiting an ON resistance when closed;
a low-noise amplifier circuit coupled to the hR switch in order to amplify low-voltage pulses received from the switch while minimizing electronic noise, wherein said amplifier circuit requires an input resistance and a feedback resistance, and wherein said input resistance is said ON resistance of said T/R switch; and
a control circuit which provides a control signal to said control terminal, wherein said control circuit is a servo-loop circuit for generating an electric value at said control terminal of said switch when closed.

6. The receiver circuit of claim 5, wherein the control circuit controls said ON resistance of said switch in closed mode.

7. The receiver circuit of claim 5, wherein said servo-loop circuit comprises:
a current source having an input terminal and an output terminal;
a master switch, said master switch having an ON resistance and a control terminal responsive to an electrical value, said master switch is coupled to said output terminal of the current source, whereby a current $I_{REF}$ is passed through said master switch and said electrical value at the control terminal of the master switch is capable of adjusting the voltage across said switch when closed to match a reference voltage $V_{REF}$;
said switch utilizing said electrical value at said control terminal of said master switch.

8. The receiver circuit of claim 5, wherein said servo-loop circuit comprises a single switch with the electrical value at the controlling terminal adjustable during system idle time.

9. A method of controlling voltage pulses, the method comprising the steps of:
providing a receiver circuit having a Transmit/Receive switch, a low noise amplifier and a control circuit, said switch comprising first and second signal terminals and a control terminal in electrical communication to the control circuit, and exhibiting an ON resistance when closed, said ON resistance controlled by an electric value at said control terminal provided by said control circuit, wherein said control circuit provided by the providing step is a servo-loop circuit for generating the electrical value at the control terminal of said switch when closed;
receiving voltage pulses at the first signal terminal;
blocking high voltages applied to a transducer and passing only low-voltage pulses through said switch;
converting said low-voltage signals to current signals using said switch; and
controlling said ON resistance of said switch when closed using said control circuit.

10. The method of claim 9, wherein said switch provided by the providing step is a transmit/receive switch which is open during a transmission time interval and closed during a reception time interval, said switch passing only the low-voltage pulses.

11. The method of claim 9, wherein the low-noise amplifier requires an input resistance; and further wherein said ON resistance exhibited by said switch in the providing step is the input resistance of said low-noise amplifier.

12. The method of claim 9, wherein said servo-loop circuit provided by the providing step comprises:
a current source having an input terminal and an output terminal;
a master T/R switch, said switch having an ON resistance and a control terminal responsive to an electrical value, said master T/R switch is coupled to said output of the current source, whereby a current $I_{REF}$ is passed through said master switch and said electrical value at the control terminal is capable of adjusting the voltage across said switch to match a reference voltage $V_{REF}$;
said switch utilizing said electrical value at control terminal of said master switch.

13. The method of claim 12, further comprising the step of providing a servo-loop circuit comprising a single T/R switch with the electrical value at the control terminal adjustable during system idle time.

* * * * *